United States Patent
Al-Mutairi

(10) Patent No.: US 10,166,494 B1
(45) Date of Patent: Jan. 1, 2019

(54) SYSTEM AND METHOD FOR REMEDIATION OF OIL-CONTAMINATED SAND

(71) Applicant: Meshari S. M. J. Al-Mutairi, Safat (KW)

(72) Inventor: Meshari S. M. J. Al-Mutairi, Safat (KW)

( * ) Notice: Subject to any disclaimer, the term of this patent is extended or adjusted under 35 U.S.C. 154(b) by 0 days.

(21) Appl. No.: 16/008,898

(22) Filed: Jun. 14, 2018

Related U.S. Application Data

(60) Provisional application No. 62/520,634, filed on Jun. 16, 2017.

(51) Int. Cl.

| | |
|---|---|
| *B01D 21/01* | (2006.01) |
| *C10G 1/04* | (2006.01) |
| *C02F 1/52* | (2006.01) |
| *B09C 1/02* | (2006.01) |
| *C10G 1/00* | (2006.01) |
| *B09C 1/08* | (2006.01) |
| *C02F 103/10* | (2006.01) |
| *C02F 101/32* | (2006.01) |

(52) U.S. Cl.
CPC ............... *B01D 21/01* (2013.01); *B09C 1/02* (2013.01); *B09C 1/08* (2013.01); *C02F 1/5245* (2013.01); *C10G 1/002* (2013.01); *C10G 1/045* (2013.01); *C02F 2101/32* (2013.01); *C02F 2103/10* (2013.01)

(58) Field of Classification Search
CPC .......... B09C 1/02; C10G 1/045; C10G 1/047; C10G 1/04; C10G 33/06; B01D 11/0284; B01D 2221/04; B01D 21/2472; B01D 36/04; B01D 37/00; C02F 1/5245; C02F 2101/32; C02F 2103/08; C02F 2103/10; B03B 9/02

See application file for complete search history.

(56) References Cited

U.S. PATENT DOCUMENTS

| | | | |
|---|---|---|---|
| 2,453,060 | A | 11/1948 | Bauer et al. |
| 4,336,136 | A | 6/1982 | Giguère |
| 4,891,131 | A | 1/1990 | Sadeghi et al. |
| 5,344,255 | A | 9/1994 | Toor |
| 5,376,182 | A | 12/1994 | Everett et al. |

(Continued)

FOREIGN PATENT DOCUMENTS

JP 11179229 A 7/1999

*Primary Examiner* — Pranav N Patel
(74) *Attorney, Agent, or Firm* — Richard C. Litman

(57) ABSTRACT

The system and method for remediation of oil-contaminated sand provides for washing and separation of sand from oil and oil-based contamination. The system for remediation of oil-contaminated sand includes a soil washing system for receiving a volume of oil-contaminated sand. The soil washing system mixes the volume of oil-contaminated sand with water to produce a mixture. This mixture is then delivered to a sand separator for separation into a volume of treated sand and a volume of oily wastewater. A flocculation tank receives the volume of oily wastewater. In the flocculation tank, the oily wastewater is mixed with at least one coagulant to separate the oily wastewater into treated water and oily sludge. A sludge hopper receives the oily sludge for collection. A treated water tank receives the treated water for collection and storage.

2 Claims, 1 Drawing Sheet

(56) References Cited

U.S. PATENT DOCUMENTS

| | | |
|---|---|---|
| 5,829,691 A | 11/1998 | Gaudin |
| 5,879,541 A | 3/1999 | Parkinson |
| 6,082,548 A | 7/2000 | Stephenson et al. |
| 2010/0185039 A1 | 7/2010 | Hoag et al. |
| 2013/0220891 A1 | 8/2013 | Newman et al. |
| 2014/0131258 A1 | 5/2014 | Piispanen |
| 2014/0137901 A1 | 5/2014 | Coates et al. |
| 2014/0151268 A1 | 6/2014 | Soane et al. |
| 2015/0014221 A1 | 1/2015 | Yoon |
| 2015/0060367 A1* | 3/2015 | Ishii .................... C02F 1/5209 210/709 |
| 2015/0099681 A1 | 4/2015 | Rehage |
| 2016/0107210 A1 | 4/2016 | Meyer et al. |

\* cited by examiner

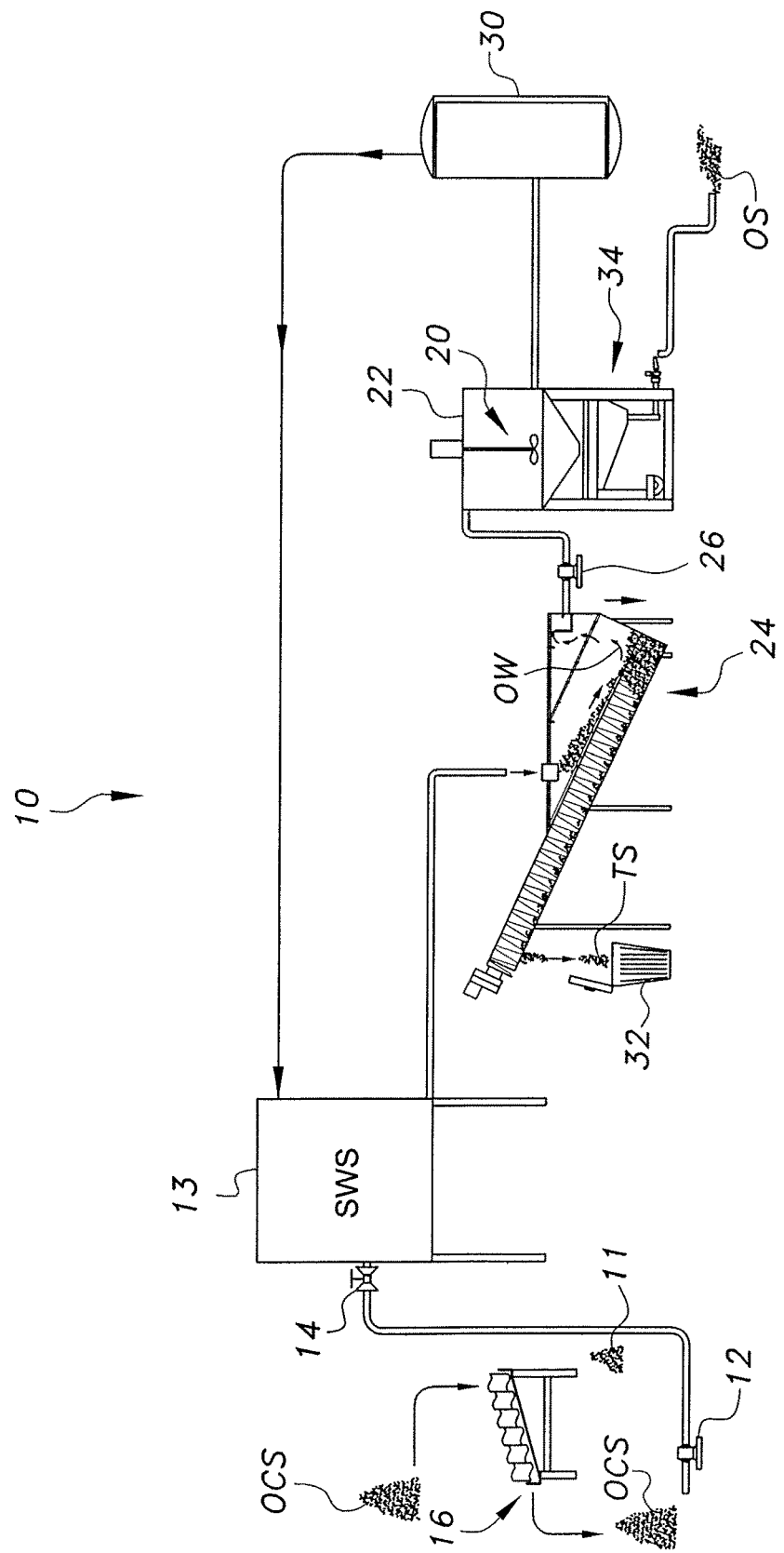

SYSTEM AND METHOD FOR REMEDIATION OF OIL-CONTAMINATED SAND

CROSS-REFERENCE TO RELATED APPLICATION

This application claims the benefit of U.S. Provisional Patent Application Ser. No. 62/520,634, filed on Jun. 16, 2017.

BACKGROUND

1. Field

The disclosure of the present patent application relates to the treatment of soil, sands, and the like, and particularly to a system and method for the remediation of oil-contaminated sand.

2. Description of the Related Art

Oil sands (also referred to as tar sands or bituminous sands) are a type of unconventional petroleum deposit. Although it is useful to extract usable oil and other petroleum products from the oil sands, the recovered sand is also of great use. If the sand can be effectively washed or cleaned of oil and other oil-based materials, the sand could be used for a variety of industrial applications, such as the production of asphalt concrete mixes in road bases, secondary roads, impermeable layers for landfills and containment structures, stabilizing steep embankments, enhancement of resistance to the penetration of water, chloride ions, alkali ions and the like in concrete, etc.

Although the use of surfactants is common for the separation of oil from oil sands, the primary focus of such techniques is the remediation of oil. Thus there has been little focus on further or additional processing for the sand. Thus, a system and method for remediation of oil-contaminated sand addressing the aforementioned problems is desired.

SUMMARY

The system and method for remediation of oil-contaminated sand provides for washing and separation of sand from oil and oil-based contamination. The system for remediation of oil-contaminated sand includes a feed sieve for receiving an initial volume of oil-contaminated sand and separating out material above a desired size, such as coarse aggregate, metal pieces, etc., therefrom. A soil washing system receives the volume of oil-contaminated sand from the feed sieve and mixes the volume of oil-contaminated sand with water to produce a mixture. This mixture is then delivered to a sand separator for separation into a volume of treated sand and a volume of oily wastewater. A flocculation tank receives the volume of oily wastewater. In the flocculation tank, the oily wastewater is mixed with at least one coagulant to separate the oily wastewater into treated water and oily sludge. A sludge hopper receives the oily sludge for collection. A treated water tank receives the treated water for collection and storage. The treated water may be recycled by the system, particularly for use as the water source for the soil washing system.

These and other features of the present disclosure will become readily apparent upon further review of the following specification and drawings.

BRIEF DESCRIPTION OF THE DRAWINGS

The sole drawing FIGURE is a schematic diagram illustrating a system for remediation of oil-contaminated sand.

DETAILED DESCRIPTION OF THE PREFERRED EMBODIMENTS

The system and method for remediation of oil-contaminated sand (OCS) provides for washing and separation of sand from oil and oil-based contamination. As illustrated in the sole drawing FIGURE, the system for remediation of oil-contaminated sand 10 includes a feed sieve 16 for receiving a volume of oil-contaminated sand. The feed sieve 16 has a relatively small sieve mesh or other suitable type of filter (on the order of 25 mm, for example) for separating out large particles 11, such as coarse aggregate, metal pieces, etc. The sieved volume of oil-contaminated sand is then fed to a soil washing system (SWS) 13 by a solid pump 12 or the like, and the flow into the soil washing system 13 may be selectively controlled by a valve 14.

As will be described in greater detail below, a test of the system for remediation of oil-contaminated sand 10 was performed using a mixture of 150 kg of oil-contaminated sand and 200 L of water input into the soil washing system 13, which operated for two hours. The soil washing system 13 mixes the oil-contaminated sand with water, yielding a mixture of washed or treated sand and oily wastewater. The soil washing system 13 includes a tank, which is made from any type of suitable material that will not degrade under the cleaning, such as stainless steel.

The soil washing system 13 is in communication with a sand separator 24 for separating the oily wastewater (OW) from the treated sand (TS) in the mixture. During testing, the mixture of OW and TS was left in the sand separator 24 for thirty minutes to allow full settling of the treated sand. In full operation, it is expected that the treated sand may be extracted within ten minutes. The treated sand has an oil residue volume of less than 0.5% following separation. It should be understood that any suitable type of sand separator 24 may be used, such as a hydrocyclone sand separator system. The treated sand may then be collected in any suitable type of receptacle 32 and then used for any desired purpose, such as use in the production of asphalt and/or concrete mixes, impermeable layers for landfills, etc.

The oily wastewater is pumped by a dewatering pump 26 or the like to a flocculation tank 22, preferably within ten minutes of separation from the treated sand. The flocculation tank 22 includes a mixer 20 for mixing the oily wastewater with at least one coagulant for separation of the oily wastewater into treated water and an oily sludge. It should be understood that any suitable type(s) of coagulant may be used. In testing, 60 g of aluminum sulfate were mixed into approximately 100 mL of distilled water, and this mixture was used as the coagulant. Mixing of the coagulant(s) and the oily wastewater in the flocculation tank 22 by mixer 20 preferably occurs with an agitation speed of approximately 50 rpm for a period of approximately forty-five minutes to ensure that the oily wastewater and the coagulant(s) are well mixed. The mixing speed may then be gradually reduced to 0 rpm, followed by a settling period of approximately three hours.

The treated water is drawn off and collected in treated water tank 30. The treated water may be recycled through the system to be used in soil washing system 13. For the exemplary quantities given above during testing, about 20 L of treated water was produced. The oily sludge (OS), which is mostly accumulated asphaltenes and resins, is then collected from sludge hopper 34 for disposal or recycling.

In experiments conducted over a three-week period, three different samples of oil-contaminated sand were treated using the system for remediation of oil-contaminated sand 10. In the first week, a relatively light level of contamination was tested, specifically for a sample with oil contamination of 8,645.0 mg/kg. In the second week, a relatively heavy level of contamination was tested, specifically for a sample with oil contamination of 18,640.0 mg/kg. In the third week, a medium or mid-range level of contamination was tested, specifically for a sample with oil contamination of 11,548.7 mg/kg. According to the Kuwait Environment Public Authority (KEPA), oil contamination in soil of up to 10,000 mg/kg is acceptable. Here, reduction of contamination to this level is achieved, even without the need of an additional surfactant. Thus, surfactants were not used in the testing, although it should be understood that surfactants may be used in conjunction with the present system. A lower final concentration of total petroleum hydrocarbons (TPH), on the order of 500 mg/kg, may be achievable with the addition of surfactants. However, it should be noted that the use of additional surfactants with the present system would require additional elements, such as an aeration system for the biodegradation of the surfactant(s) in the downstream process during the wastewater treatment. The results of the three week testing are shown below in Table 1.

TABLE 1

Total Petroleum Hydrocarbon (TPH) Testing Results

| Day | Trial No. | Average TPH (mg/kg) before treatment | Average TPH (mg/kg) after treatment |
| --- | --- | --- | --- |
| 1 | 1 | 8,645.0 | 980.0 |
| 2 | 2 | | |
| 3 | 3 | | |
| 4 | 4 | | |
| 5 | 5 | | |
| 6 | 1 | 18,640.0 | 3527.5 |
| 7 | 2 | | |
| 8 | 3 | | |
| 9 | 4 | | |
| 10 | 5 | | |
| 11 | 1 | 11,548.7 | 948.8 |
| 12 | 2 | | |
| 13 | 3 | | |
| 14 | 4 | | |
| 15 | 5 | | |

As expected, the percentage of oil removal is directly dependent upon the original concentration of contamination. The percentage of oil removal using the light contamination, medium contamination and high contamination samples were 88.7%, 91.2% and 81.1%, respectively. The TPH in the soil after treatment was well below the maximum allowable level of 10,000 mg/kg (<1.0%) in each sample. This improvement is associated with the increased length of time of contact between the water and the soil sample and the efficiency of the system. Thus, the washing time is believed to correspond to the wetting of the soil with oil residue. This suggests that the wettability of contaminated soil and contact angle between the soil and oil increase with washing time. The outcome of the testing shows that the percentage of oil removal for light contamination and medium contamination samples were slightly increased after one hour of soil washing. This slight removal of oil residue may be attributed to the nature of weathered, contaminated soil. Thus, it can be concluded that a washing time of more than one hour will not have much effect on oil removal efficiency for the light or medium contamination samples. Thus, washing for more than one hour would be uneconomical.

Since the weight of the oil-contaminated soil was maintained during testing with all samples, it can be seen that the improvement of oil removal was dependent on the concentration of oil residue in the soil. As shown in Table 1, a lower efficiency of oil removal was obtained with the high contamination sample, which was weathered in an open environment over many years, thus suggesting that the oil residue exhibits an adhesive strength with the sand, i.e., the oil residue remains strongly attached to the sand particles.

For the tests described above, the electrical power required to operate the overall system was provided by a 32 A, three-phase+neutral supply. Ground water was used, with 200 L of water per wash cycle. It is preferred that the washing system be environmentally friendly. Thus, the above aluminum-based coagulant, or similar environmentally friendly coagulants, are preferred. As described above, in testing, 150 kg of oil-contaminated sand mixed with 200 L of water was washed in the soil washing system 13 for a period of two hours. In sand separator 24, a period of thirty minutes was used for full settling of the sand, and the actual separation of the sand took approximately fifteen minutes. The oily wastewater was extracted by pump 26 over a period of approximately ten minutes. It is expected that settling and separation time will be reduced with the use of a hydrocyclone sand separator system. The system 10 should produce approximately 160 L to approximately 170 L of oily wastewater. With an aluminum coagulant added in flocculation tank 22 at 150-300 mg/L, the oily sludge should fully settle after about three hours of flocculation. In the tests described above, 30 L of oily sludge was extracted from the light contamination sample, 64 L of oily sludge was extracted from the heavy contamination sample, and 45 L of oily sludge was extracted from the medium contamination sample.

It is to be understood that the system and method for remediation of oil-contaminated sand is not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method for remediation of oil-contaminated sand, consisting of the steps of:
    receiving a volume of oil-contaminated sand at a feed sieve, wherein the sieve is sized and configured to filter out coarse aggregate;
    mixing a sieved volume of oil-contaminated sand with water to produce a mixture;
    separating the mixture into a volume of washed sand and a volume of oily wastewater, wherein the sand separation is performed by a hydrocyclone sand separator system for at least ten minutes and results in a sand having less than 0.5% oil residue volume;
    collecting the washed sand;
    pumping the oily wastewater into a flocculation tank and mixing the oily wastewater with a coagulant at a speed of 50 rpm for a period of 45 minutes to separate the oily wastewater into treated water and oily sludge;
    reducing the mixing speed to zero rpm;

settling the oily wastewater and coagulant mixture for three hours;
extracting and collecting the oily sludge; and
extracting and collecting the treated water.

2. The method for remediation of oil-contaminated sand as recited in claim 1, wherein the step of mixing the oily wastewater with the at least one coagulant comprises mixing the oily wastewater with a coagulant mixture comprising aluminum sulfate and water.

* * * * *